US011628368B2

United States Patent
Rico

(10) Patent No.: US 11,628,368 B2
(45) **Date of Patent: *Apr. 18, 2023**

(54) SYSTEMS AND METHODS FOR PROVIDING USER INFORMATION TO GAME CONSOLE

(71) Applicant: Sony Interactive Entertainment Inc., Tokyo (JP)

(72) Inventor: Javier Fernandez Rico, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 100 days.

This patent is subject to a terminal disclaimer.

(21) Appl. No.: 17/140,125

(22) Filed: Jan. 3, 2021

(65) Prior Publication Data

US 2021/0121785 A1 Apr. 29, 2021

Related U.S. Application Data

(63) Continuation of application No. 15/081,024, filed on Mar. 25, 2016, now Pat. No. 10,913,001.

(51) Int. Cl.
*A63F 13/795* (2014.01)
*A63F 13/332* (2014.01)
*A63F 13/537* (2014.01)

(52) U.S. Cl.
CPC .......... *A63F 13/795* (2014.09); *A63F 13/332* (2014.09); *A63F 13/537* (2014.09)

(58) Field of Classification Search
CPC ..... A63F 13/795; A63F 13/332; A63F 13/537
See application file for complete search history.

(56) References Cited

U.S. PATENT DOCUMENTS

2007/0218997 A1* 9/2007 Cho .................... A63F 13/795 463/42
2008/0318687 A1* 12/2008 Backer .................. A63F 13/48 463/43

* cited by examiner

*Primary Examiner* — Thomas H Henry
(74) *Attorney, Agent, or Firm* — John L. Rogitz

(57) ABSTRACT

Gamer friend devices can be detected by a gaming console and the gaming console user can be prompted to add the friend devices to a friend list, which automatically logs the friends on to the console without requiring them to manually log in. The gaming console may also be automatically configured with profile information of the friends.

20 Claims, 6 Drawing Sheets

600

Settings

604 ☐ Allow friends and consoles to discover me 602

Once logged into another console, load: 606

610
☐ Game Information
☐ Profile Information
☐ PlayStation Store Information
☐ Internet Movie Account Information
☐ Playstation Home Screen
608

614 ○ Save your data at new consoles for future use 612

618 ○ Automatically launch app if another game console is detected and/or when you connect to Wi-Fi network 616

SYSTEMS AND METHODS FOR PROVIDING USER INFORMATION TO GAME CONSOLE

FIELD

The application relates generally to systems and methods for providing user information to a game console.

BACKGROUND

Often times, a first gamer will go to the residence of a second gamer to play video games on the second gamer's console. As recognized herein, it is sometimes advantageous to access settings and information for the first gamer using the second gamer's console while the first gamer plays games with the second gamer on the second gamer's console. However, as also recognized herein, the first gamer may sometimes have difficulty remembering information that is to be input to the second gamer's console to access the settings and information for the first gamer.

SUMMARY

Accordingly, a device includes a computer memory with instructions executable by a processor to receive data from a gaming console over a computer network from a friend device of a first gamer associated with first gamer profile information. The instructions are executable to present a selector on a display that is selectable to add the first gamer to a gamer friends list. Responsive to selection to add the first gamer to the gamer friends list, automatically and without requiring the first gamer to manually log on to the gaming console, the gaming console is configured using information in the first gamer profile information.

In another aspect, a gaming console includes a processor and a computer memory with instructions executable by the processor to receive data over a computer network from a first device of a first gamer associated with first gamer profile information. The instructions are executable to present a selector on a display that is selectable to add the first gamer to a gamer friends list. Responsive to selection to add the first gamer to the gamer friends list, automatically and without requiring the first gamer to manually log on to the gaming console, the gaming console is configured using information in the first gamer profile information.

In another aspect, a method includes, at a gaming console, receiving data over a computer network from a first device of at least a first gamer associated with first gamer profile information. The method includes presenting a selector on a display that is selectable to add the first gamer to a gamer friends list, and responsive to selection to add the first gamer to the gamer friends list, automatically and without requiring the first gamer to manually log on to the gaming console, configuring the gaming console at least in part using information in the first gamer profile information.

In another aspect, a first device includes at least one computer readable storage medium that is not a transitory signal and that comprises instructions executable by at least one processor. The instructions are executable by the processor to communicate with a gaming console over a local area network (LAN) to provide gaming profile information to the gaming console.

In some embodiments, the instructions may be executable by the at least one processor to connect to the LAN and execute an application to communicate with the gaming console over the LAN to provide the gaming profile information to the gaming console. The application may be associated with a manufacturer of the gaming console.

The instructions may be executable by the at least one processor to execute the application to communicate with the gaming console responsive to connection to the LAN and/or responsive to receipt of a signal from a transmitter controlled by the gaming console. Additionally, in some embodiments the instructions may be executable by the at least one processor to execute the application to identify data pertaining to one or more users with devices also connected to the LAN and to present information associated with the one or more users on the display based on identification of data pertaining to the one or more users. The instructions may even be executable by the at least one processor to present at least one selector on the display that is selectable to add the one or more users to a gaming friends list.

Still further, in some examples the gaming profile information may comprise a gaming profile identifier and/or a gaming profile password. The gaming profile information may be usable to access gaming profile data stored remotely from the first device and the gaming console. Still further, the LAN may be a password-protected Wi-Fi network, and the first device may authenticate itself to the password-protected Wi-Fi network using another password to communicate with the gaming console.

In another aspect, a gaming console includes at least one processor and at least one computer readable storage medium that is not a transitory signal. The at least one computer readable storage medium comprises instructions executable by at least one processor to connect to a local area network (LAN) and receive, via the LAN, gamer information from a first device and associated with a first user.

In still another aspect, a method includes connecting to a Wi-Fi network and communicating with a gaming console over the Wi-Fi network to provide user information to the gaming console.

The details of the present application, both as to its structure and operation, can best be understood in reference to the accompanying drawings, in which like reference numerals refer to like parts, and in which:

DETAILED DESCRIPTION

Figure 1:
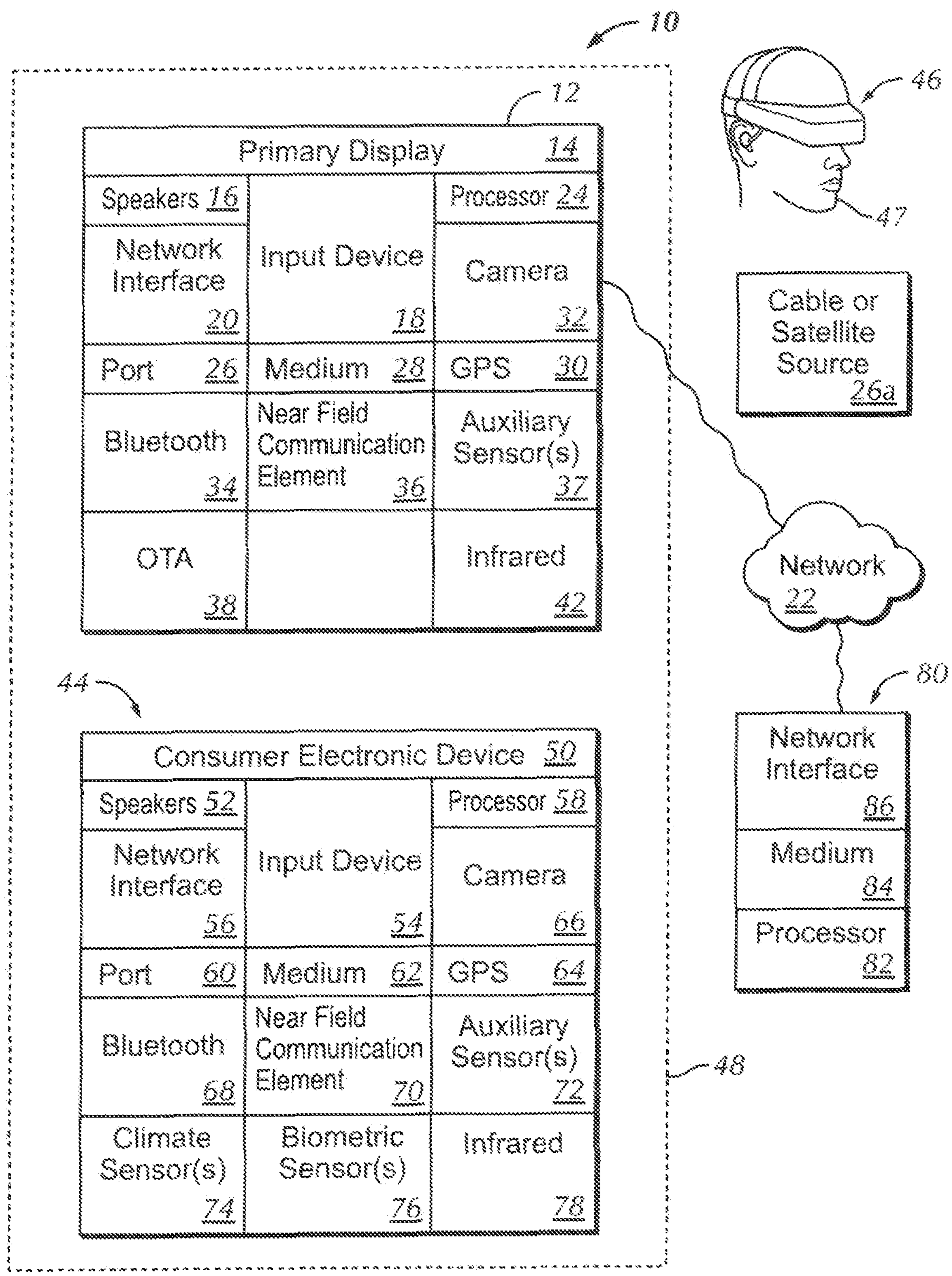
FIG. 1 is a block diagram of an example system in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be, e.g., a separate or integrated set top box, or a satellite receiver. Or, the source 26*a* may be a game console or disk player containing content that might be regarded by a user as a favorite for channel assignation purposes described further below. The source 26*a* when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVDs 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or gaming computer (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a VR headset, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), a pressure sensor, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
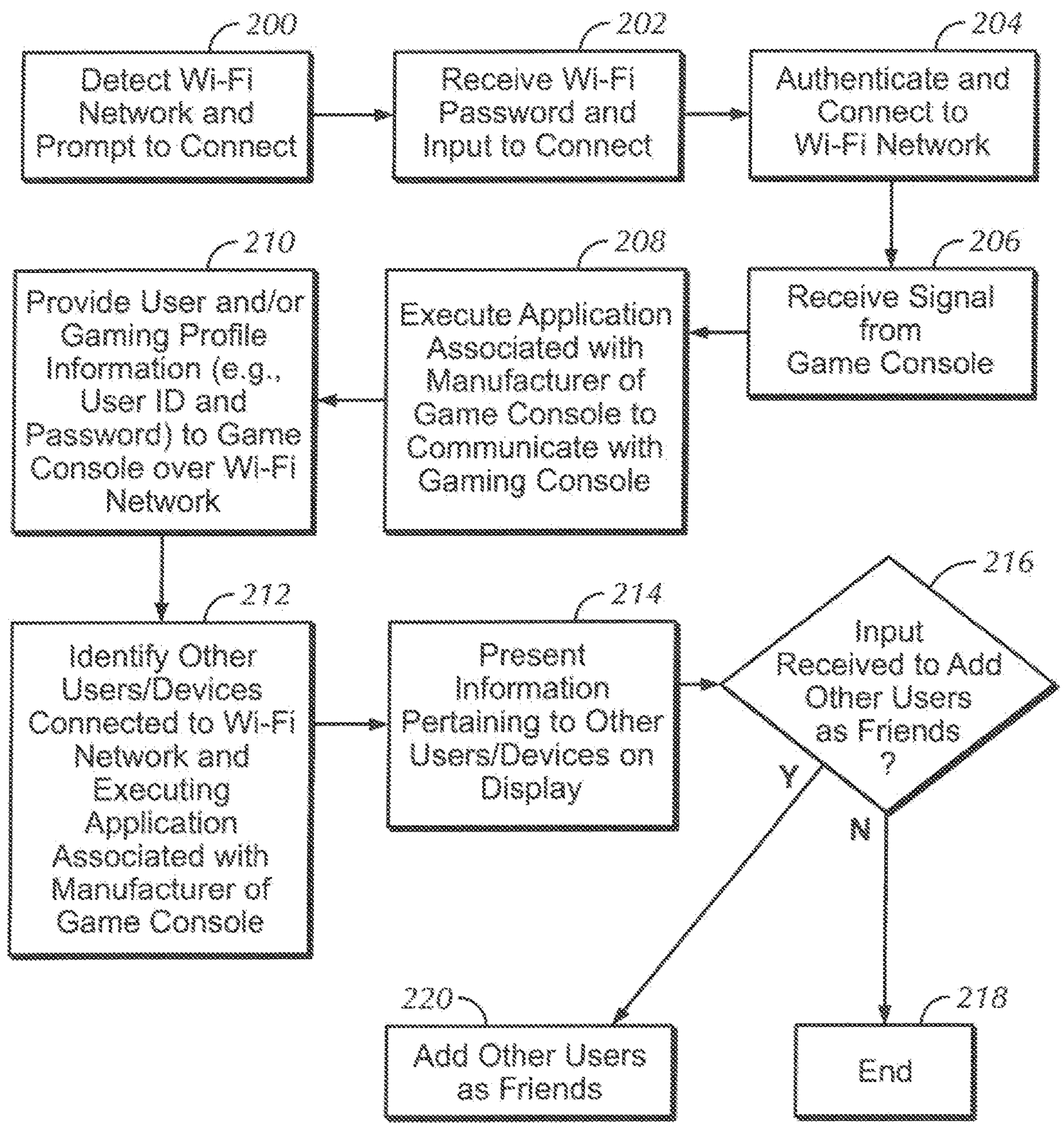
FIGS. 2-4 are flow charts of example algorithms in accordance with present principles.

FIG. 2 shows logic that may be implemented by the processor of a first user's smart device (referred to below as a "first device") for the first device to be used for login or registration to a gaming console, gaming network, gaming server, etc. and for finding potential gaming friends in accordance with present principles. Commencing at block 200, the logic may detect a local area network (LAN), such as a password-protected Wi-Fi network of a personal residence. Also at block 200, the logic may prompt the first user for input to connect to the Wi-Fi network. At block 202 the logic may then receive input to connect to the Wi-Fi network, which in some embodiments may include receipt of a network identification (ID) and/or network password as well as a command to connect to the Wi-Fi network.

From block 202 the logic may then move to block 204 where the logic may communicate with another device providing access to the Wi-Fi network, such as a Wi-Fi router, to authenticate the first device and/or network ID and thus establish a connection of the first device to the Wi-Fi network. Thereafter the logic may proceed to block 206 where, in some embodiments, the logic may receive a presence signal from a video game console that indicates the presence or existence of the video game console one or both of based on receipt of the signal itself and/or based on the signal being transmitted over the Wi-Fi network to which the first device is also now connected. Thus, in some examples the presence signal may be transmitted from the game console to the first device over the Wi-Fi network, while in other embodiments the presence signal may be transmitted through another mode of communication such as a Bluetooth communication. For example, a Bluetooth beacon signal may be received via a Bluetooth communication element on the first device, with the beacon signal being transmitted from a Bluetooth beacon/transmitter on the game console or otherwise under the control of the game console.

The logic may then proceed to block 208 where the logic may launch and/or execute an application to communicate with the game console, such as one associated with and provided by a manufacturer of the game console. In example embodiments, the application may be launched and/or executed at block 208 responsive to receipt of the signal at block 206, responsive to authentication and/or connection to the Wi-Fi network at block 204, responsive to receipt of a command from the first user to launch and/or execute the application, etc. That is, at block 208, the application may already be running in the background, in which case the user doesn't need to run anything in their cellphone and their user will be registered in the game console the moment they connect to the local area network. However, if the application is not running, the user will need to initiate the application.

After block 208 the logic moves to block 210, where the logic may transmit user information and/or gaming profile information for the first user to the game console over the Wi-Fi network. The information may include a user ID and/or password for accessing services and user profile information hosted and stored remotely from the first device and/or game console by a manufacturer of the game console or another entity. The user ID and password that are transmitted may be pre-stored at the first device based on the first user previously inputting it at a previous time. Furthermore, in example embodiments the user and/or gaming profile information may be different from the information received at block 202 and instead be associated with a gaming profile of the first user that is associated with a particular gaming platform, such as Sony Playstation™.

The logic may transmit the user and/or gaming profile information at block 210 automatically without additional user input beyond the information to connect to the Wi-Fi network itself as received at block 202 and/or beyond input to launch the application at block 208. For instance, the information may be transmitted automatically responsive to receipt of the signal at block 206 or responsive to a determination that a game console is also communicating over the Wi-Fi network as may be determined based on signals sent from the game console over the Wi-Fi network.

The logic of FIG. 2 may next move from block 210 to block 212, where the logic may continue to execute the application launched at block 208 to identify other users and/or devices communicating over the Wi-Fi network. In some examples, the other users/devices may be identified based on presence signals transmitted by the respective other devices over the Wi-Fi network. The other users/devices may also be identified based on other information transmitted by the other devices to the first device over the Wi-Fi network, such as information pertaining to use of applications similar or complimentary to the application executed at the first device at block 208 that are being concurrently executed by the other devices. Still further, the other users/devices may be identified based on information received from the other devices indicative of the other users being associated with the same gaming platform and/or using the same game console brand or type as the first user (e.g., Sony Playstation™), or still other information.

Responsive to identification of one or more other users/devices at block 212, at block 214 the logic may continue to execute the application launched at block 208 to now present information on a display pertaining to the other users/devices. The information may comprise data related to the other users/devices, including profile names, user names, user avatars, mutual friends of both the first user and the other user(s), favorite or most-frequently played games, etc. An example of such information will be described below in reference to FIG. 5.

The logic of FIG. 2 may next move from block 214 to decision diamond 216, where the logic may determine whether user input has been received to add one or more of the other users as friends of the first user for the purposes of gaming using respective user profiles and/or IDs, for communicating with the other users through a particular gaming platform or communication channel, etc. A negative determination at diamond 216 may cause the logic to move to block 218 where it may end, while an affirmative determination at diamond 216 may instead cause the logic to move to block 220 where other users are added as friends for which input has been received to add those other users as friends. Adding as friends may include adding the other user(s) to the first user's gaming friend's list, downloading information at the first device or the first user's game console (that may be different from the console referenced above at, e.g., block 206) related to the other users, etc.

Figure 3:
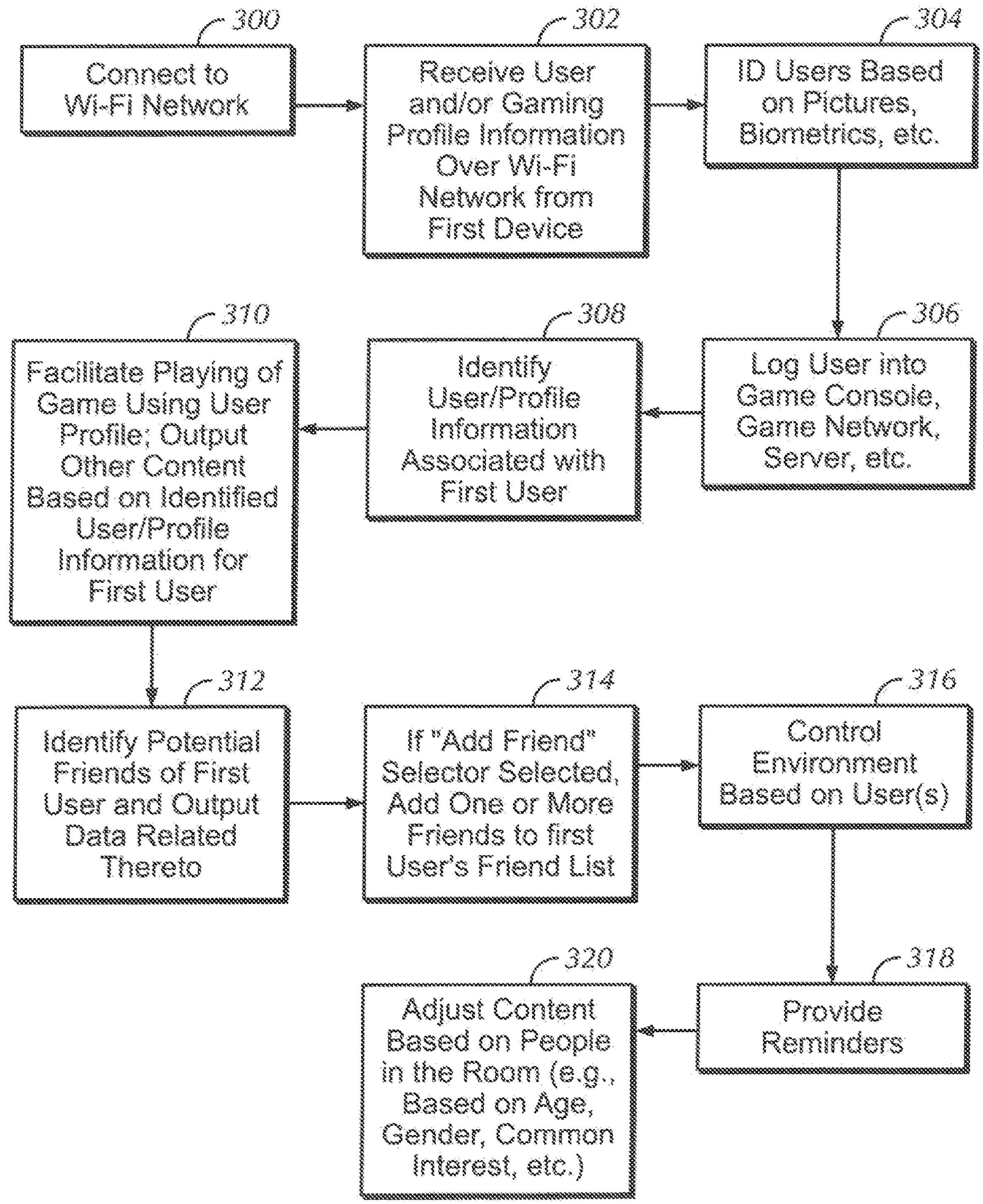

FIG. 3 shows logic that may be executed by a game console in accordance with present principles. Beginning at block 300, the logic may authenticate and connect the game console to a LAN such as the password-protected Wi-Fi network described above in reference to FIG. 2. Also at block 300, the logic may begin transmitting presence and/or beacon signals for detection by other devices, and/or may otherwise begin communicating with other devices also connected to the Wi-Fi network. The logic may then proceed to block 302 where the logic may receive user and/or gaming profile information over a Wi-Fi network from a device, such as the user/gaming profile information from the first device described above.

Thereafter, in some examples the logic may proceed to block 304 where the logic may also identify a user, such as the first user described above, and associated login or registration data for the user based on information other than that received at block 302, such as based on fingerprint or voice input provided by or sensed from the user. The user may also be identified based on images of the user gathered by a camera on the game console or received from another device imaging the user's face. Still other types of biometric identification may be used to identify the user, such as retina identification.

In some embodiments, biometric identification may be performed by comparing the received input to reference data and/or a reference template, and then determining whether the received input matches the reference data/template. Responsive to a match, a user identifier associated with the matched reference data may be identified to thus identify the user. Once the user has been identified, the user's identity may be used to access a secure cloud storage area, for instance, where user and/or gaming profile information such as a user ID and password may be accessed.

Then at block 306, the logic of FIG. 3 may log the first user in to the game console executing the logic of FIG. 3, to a game network such as one established and maintained by a manufacturer of the game console, and/or to a game server such as one hosting the game network or otherwise providing access to user/profile information associated with the first user, etc. Block 306 may have been arrived at responsive to receipt of the gaming and/or profile information at block 302 and/or responsive to identifying the first user and associated login data based on biometric input received at block 304.

The logic may then move to block 308, where the logic may access the user/profile information responsive to successful log in of the first user at block 306. The user/profile information may be accessed from storage housed locally at the game console or may be accessed remotely via the game network and/or game server.

The logic of FIG. 3 may then proceed to block 310 where the logic may allow the first user to play video games through the game console using the first user's profile as identified from the user/profile information accessed at block 308. The logic may do so indefinitely, for a threshold period of time from login or access to the user/profile information, for as long as the first device is connected to the Wi-Fi network, etc.

Also at block 310, the logic may output other content based on the user/profile information identified at block 308. The content may include a customized home screen for the game console that is tailored to the first user (such as based on user input and preferences). The content may also include customized electronic store preferences for purchasing items determined to be of interest to the first user (such as based on user preference data) from an electronic store, where the electronic store may be associated with games playable on the game console and/or associated with the manufacturer of the game console itself. Still further, the content may include electronic data for a movie Internet streaming account associated with the first user such as user preferences for the account and a list of most-recently watched items. The content may also include information related to stored data for one or more games that the first user has played in the past using a game console of the same type as the one that executes the logic of FIG. 3, such as information related to a highest level completed for a particular game or information related to a status or progress of play for the particular game. The content that is presented may include still other information, such as profile information for the first user like a gamer ID, gamer avatar, list of the first user's gamer friends, interests of the first user, etc.

The logic of FIG. 3 next moves to block 312 where the logic may identify one or more potential friends to recommend to the first user and output data related thereto, such as on the display accessible to the game console. The logic may identify the one or more potential friends based on identification of other devices (respectively associated with the other users) that are communicating over the Wi-Fi network using their own versions of the application launched by the first device at block 208. In some embodiments, the other devices and hence users that are identified based on communication over the Wi-Fi network may even be compared against a list of the first user's current friends (such as may have been identified at block 308) so that only identified users not already on the list may be identified as potential friends.

Still other ways to identify potential friends may also be used in accordance with present principles, such as based on other users being logged in to or otherwise associated with the game console executing the logic of FIG. 3 or other users being associated with a location at which the game console is disposed. Identification of potential friends may also be based on identification of Bluetooth or NFC signals from the other user's device. Those signals may even be processed using a received signal strength indication (RSSI) algorithm to identify a distance from which the signal(s) emanated to then determine whether the identified distance is within a threshold distance for recommending potential friends. Comparisons of location coordinates from respective devices may also be used to determine if the first user and another user are in the same room, building, proximity, etc. and hence whether to recommend the other user as a potential friend based on being in the same room, building, proximity, etc. as the first user. Still further, potential friends may be identified based on user/game profile information received directly from those users' respective devices, which may then be compared against a list of users of a particular brand or type of game console to recommend potential friends if they are included on the list. Even further, potential friends may be identified based on those potential friends previously playing video games, using their respective profiles, with a current friend of the user.

The logic of FIG. 3 may the move to block 314 where, responsive to receipt of a command to add one or more potential friends as friends of the first user, the logic may add the potential friend(s) as friends of the first user, such as adding them to a friends list for the first user for the first user to then engage in a video game also played by the new friend, for communicating through a particular gaming platform or communication channel with the new friend, etc. In some embodiments, the command may be received at a selector presented on the display accessible to the game console or one presented on a display of the first user's personal device.

The logic of FIG. 3 may next proceed to block 316, where, based on identification of the first user at block 302 or block 304, the logic may control an environment in which the first user is identified as located. For instance, the game console may be connected via the Wi-Fi network to other devices within a home in an Internet of things environment, and hence the game console may control the output levels of lights in the room to suit the first user's specified lighting preference(s). Based on one or more of the first user's specified preferences, still other features within the environment may be controlled by the game console as well, such as blinds, drapes, or shades that are within the environment being opened or closed, and such as headphones, speakers or a VR headset being turned on. A climate control system or thermostat may also be controlled by the game console, such as to set the room in which the first user is disposed to a particular temperature based on the first user's preference. Still further, the game console may even actuate a fan on the game console itself or an air conditioning unit in the building for cooling the room in which the game console is disposed to thus cool the game console if temperature of the game console is identified as reaching a temperature threshold.

It is to be understood that the action(s) taken at block 316 may be taken responsive to identification of the first user, responsive to log in of the first user at block 306, responsive to the first user starting to play a game on the game console executing the logic of FIG. 3 or otherwise providing input thereto, etc.

From block 316 the logic may next move to block 318 where the logic may provide one or more reminders to the first user at an appropriate time. For instance, the first user may have previously provided a command at the game console executing the logic of FIG. 3 or another game console to be reminded about an upcoming event. The reminder and/or associated data determined based on the received command may then be associated with the first user's game profile information so that when the first user is identified and logged in to the game console executing the logic of FIG. 3 (such as at block 306), the reminder information may be accessed and the game console may provide the reminder at the appropriate time. For instance, the first user may wish to be provided with a reminder to stop playing a video game at a particular time because of an upcoming appointment, or a reminder to stop playing a video game within a prescribed time period or at a particular time so that a particular television show specified by the first user may be watched.

From block 318 the logic of FIG. 3 may next proceed to block 320. At block 320 the logic may present content or adjust content being presented under control of the game console based on people identified as being proximate to the game console or within a room in which the game console is disposed. The people may be identified based voices detected (such as at block 304) using input a microphone in communication with the game console, and/or based on facial recognition using images of the people gathered by a camera in communication with the game console. The people may be identified by name and specific information related to each person may also be determined. Additionally or alternatively, the people at the location may simply be identified based on characteristics such as age, gender, height, etc. that may be identified from the voice input or images by executing voice or object characteristic processing algorithms, respectively, thereon to identify the characteristics of the people.

For instance, the game console may determine the age of people in the room and adjust content based on that so that content up to only a certain age level is presented that matches the lowest age level of a person in the room. E.g., if children are identified as being in the room, R-rated content in an electronic store or gaming content rated MA may not be presented, but instead only G-rated content may be presented. In some embodiments, the content of a game currently being played using the game console may itself be altered, such as not presenting images of the game with as much blood and graphic detail as would otherwise be presented if no children were identified as being present in the room. In another example, responsive to one or more children being detected as being present, the game console may provide a notification to a user that the children are present and prompt the user to change content being presented and/or stop playing a graphic video game entirely. In still another example, if the game console detects a person of a certain gender as being present, the game console may recommend content tailored or profiled to that gender or otherwise associated therewith.

Still further, if the game console detects plural people in the room which the game console identifies as having common interests, content may be identified and/or presented that is associated with or profiled for the common interest(s). The common interests may be identified based on a comparison of respective gaming profile information for each person indicating respective interests of each person to thus identify common interests, where the gaming profile information may be identified based on data received at block 302, identification of one or more users at block 304, etc. If one or more people are detected as being present at the location but are unidentifiable, the existence of those people may be disregarded for the purposes of presenting or adjusting content at block 320 and only the common interests of recognized people may be used.

Figure 4:
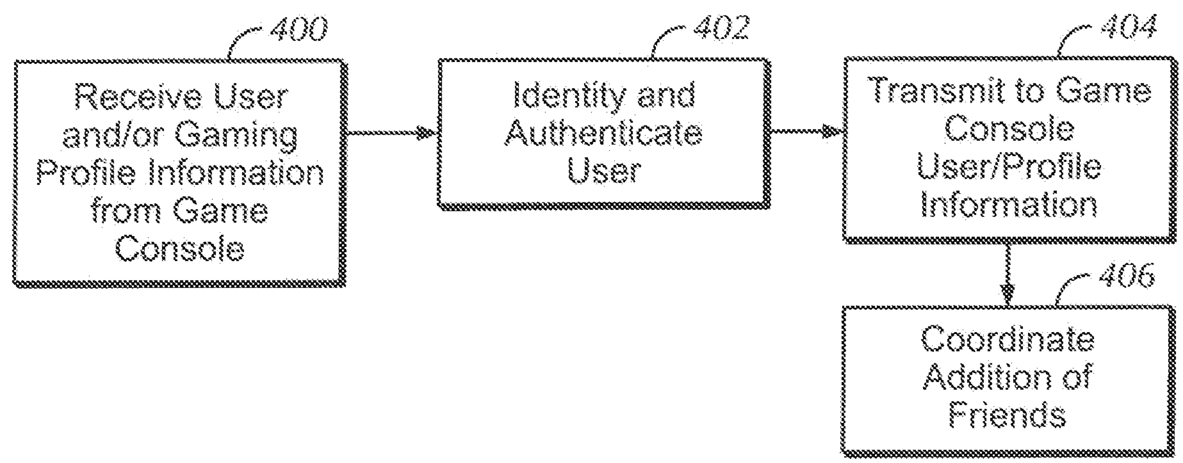

Reference is now made to FIG. 4, which shows logic that may be executed by a server in accordance with present principles. Beginning at block 400, the logic receives user and/or gaming profile information from a game console, such as one undertaking the logic of FIG. 3 discussed above. Also at block 400, the logic may receive biometric data gathered or received by the game console itself. The logic may next move to block 402, where the logic may identify and authenticate one or more users based on the information or data received at block 400. For instance, the logic may authenticate a user ID and password received at block 400, and/or may authenticate a user based on biometric data received at block 400.

From block 402 the logic may proceed to block 404 where the logic may transmit an indication that authentication has been successful (assuming it is successful), along with user/profile information for the authenticated user that may be stored at or accessible to the server. The logic may then conclude at block 406 where the logic may coordinate the addition of friends for one or more users in accordance with present principles. For instance, the logic may transmit information that two people are in the same location and are both users of a particular game console, and then coordinate the addition of one to the other's friend's list and vice versa.

Figure 5:
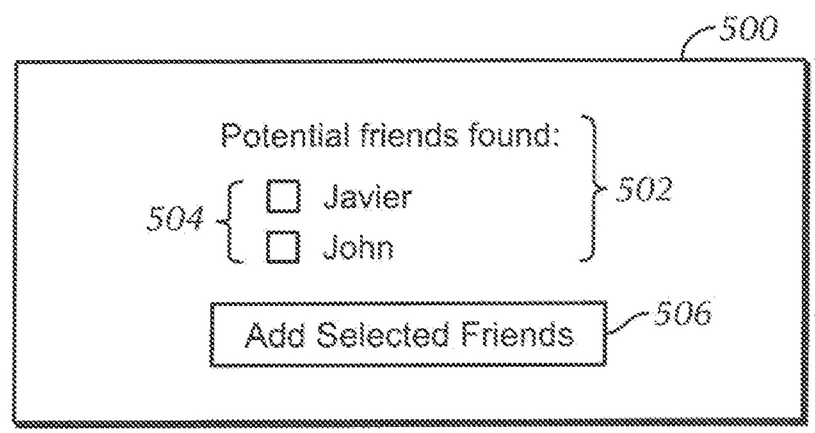
FIGS. 5-7 are example user interfaces (UIs) in accordance with present principles.

FIG. 5 shows an example user interface (UI) 500 presentable on the display of a device undertaking present principles, such as a display controlled by a device undertaking the logic of FIG. 2 or of FIG. 3. The UI 500 includes a list 502 of potential friends that a user may wish to connect with and/or add as his or her friend. Each potential friend is selectable using a respective check box 504, and then selector 506 may be selected to automatically without further user input add the selected potential friends as friends of the user. For example, the selected potential friends may be added to a friends list of the user.

Figure 6:
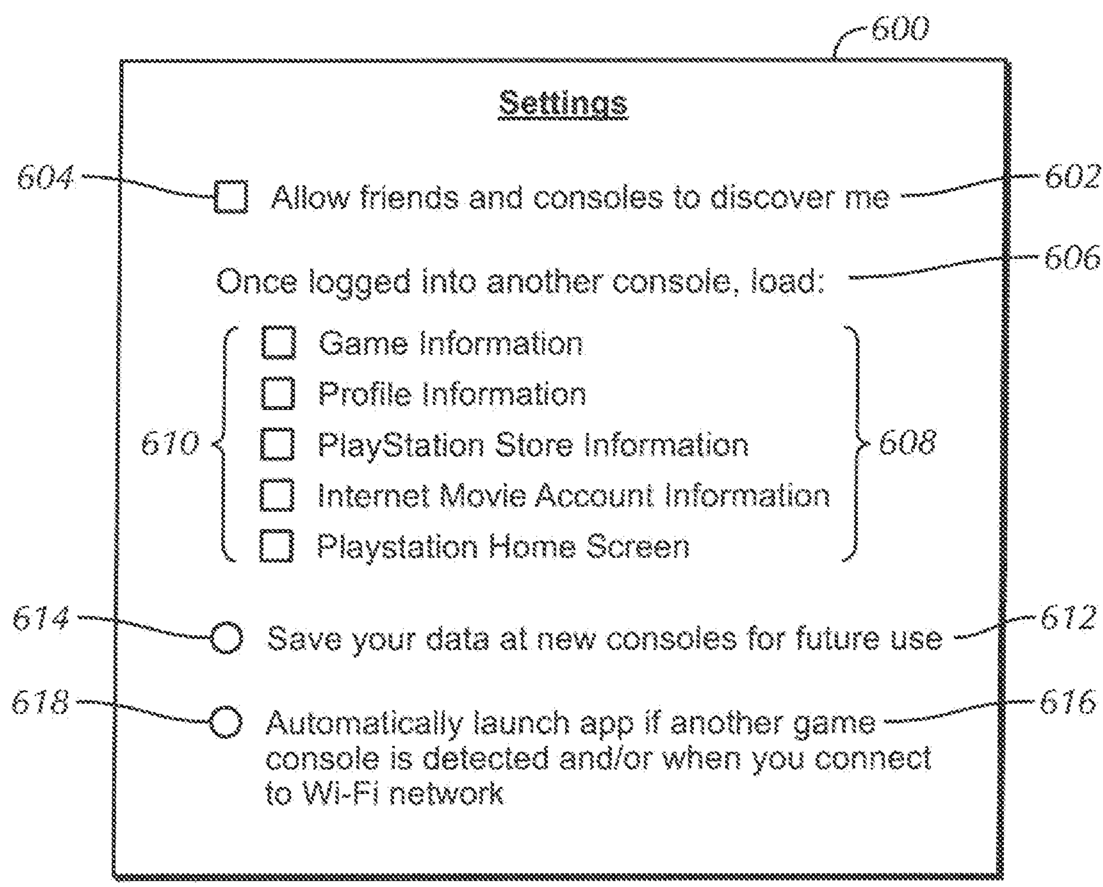

FIG. 6 shows a UI 600 for configuring settings of a device that may execute the logic of FIG. 2. The UI 600 includes a first setting 602 enableable responsive to selection of check box 604 to allow potential friends and game consoles to "discover" the user by communicating with the user's device over a LAN in accordance with present principles. Thus, setting 602 may be enableable to permit other people's devices to identify a user as a potential friend to add based on communication over a particular password-protected network, based on the user being associated with a particular type or brand of game console, and/or based on the user being at the same location as another person.

The UI 600 may also include a second setting 606 for configuring the device or a game console in communication therewith to load certain types of content and information at the game console once a user has been logged in based on communication over a LAN as described above. Example types 608 include information for a particular video game, profile information associated with the user, personalized electronic store information, movie Internet streaming account information, and home screen information for a home screen to be presented using the game console. Each of the types 608 may be enabled for presentation responsive to selection of respective check boxes 610 for each type 608.

The UI 600 also shows an option 612 enableable based on selection of radio button 614 to save data pertaining to the user at new consoles with which the user logs in and engages, such as one to which user/gaming profile information is transmitted over a LAN at block 210 described above. Thus, for instance, when option 612 is enabled, a user that has logged out of or stopped playing at a particular game console through which the user was identified and logged in over a LAN may later log back in to that console to continue playing games even without the user's personal device again communicating with the game console over the LAN to log the user in again.

As may also be appreciated from FIG. 6, the UI 600 may include an option 616 enableable based on selection of radio button 618 to automatically launch an application such as the one discussed above in reference to block 208 if a game console other than one already associated with the user is detected, such as one detected as communicating over the same LAN as the device. In addition to or in lieu of the foregoing, the option 616 may be enableable to automatically launch the application when the device connects to a (e.g., new) LAN.

Figure 7:
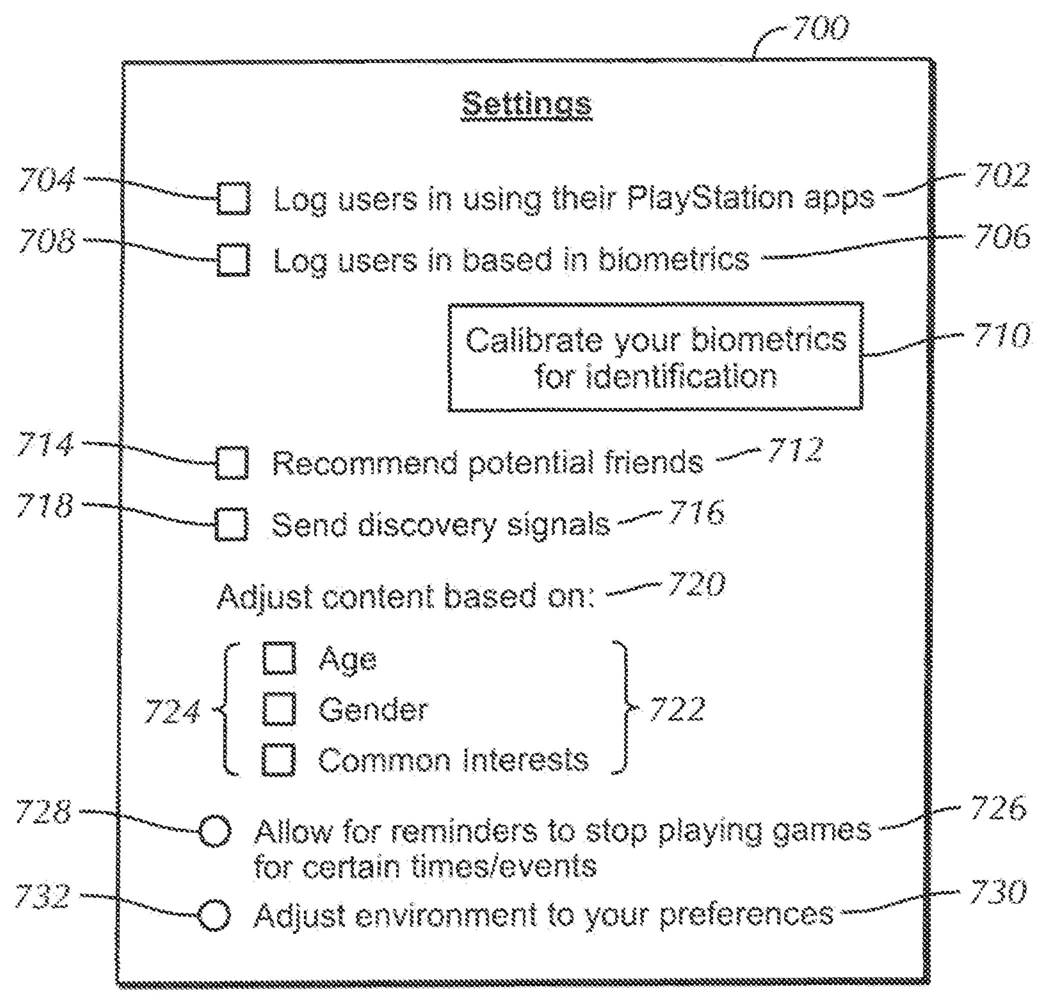

FIG. 7 shows a UI 700 for configuring settings of a device that may execute the logic of FIG. 3, such as a game console. The UI 700 includes a first setting 702 enableable based on selection of check box 704 to log users in to the game console, to a network, and/or to a server using information communicated to the game console over a LAN. The UI 700 also includes a second setting 706 enableable based on selection of check box 708 to log a user in to the game console, network, and/or server using biometric information identified from the user in accordance with present principles.

Additionally, the UI 700 may include a selector 710 selectable to automatically launch a biometric calibration program and/or present a biometric calibration UI that may be used to configure biometric identification of the user. For instance, the user may be prompted to say certain phrases during biometric calibration so that voice characteristics of the user may later be identified based on his or her voice.

The UI 700 may also include a setting 712 enableable based on selection of check box 714 to recommend potential friends of a user at the game console when they are identified in accordance with present principles. Still further, a setting 716 enableable based on selection of check box 718 may be included to transmit presence and/or beacon signals from the game console in accordance with present principles.

FIG. 7 also shows that a setting 720 may be included on the UI 700 that lists characteristics 722 of people for which content should be presented and/or adjusted as described herein. Examples of such characteristics include age, gender, and common interests, and each characteristic 722 may be selected based on selection of a respective check boxes 724 for each characteristic 722.

The UI 700 may also include an option 726 enableable based on selection of radio button 728 to allow for reminders to be presented using the game console in accordance with present principles, such as for a user to stop playing a video game because of an upcoming time or event. Last, the UI 700 may include an option 730 enableable based on selection of radio button 732 for the game console to automatically adjust an environment in which it is disposed based on user preference in accordance with present principles.

Although not shown for clarity, in some embodiments features of the UI 600 may be presented as part of the UI 700 and vice versa. For instance, the UI 700 may include a setting similar to the setting 606 along with corresponding elements similar to the elements 608 and 610.

It is to be understood that a video game console in accordance with present principles, in addition to executing logic and performing the actions discussed above, may also use a camera on or in communication with it to capture moments identified as memorable using a camera. For instance, a parent could use a feature on the application(s) discussed herein to access a live feed or stored video from the camera to see what his or her children are/were doing in the room in which the game console is disposed while the parent is away. The parent may also access a real time feed or stored video of a video game being played using the game console. As another example, a person could access a live feed or stored video showing a party at a location in which the game console is disposed.

It will be appreciated that whilst present principals have been described with reference to some example embodiments, these are not intended to be limiting, and that various alternative arrangements may be used to implement the subject matter claimed herein.

What is claimed is:

1. An assembly, comprising:

at least one processor of a computer video console programmed with instructions executable to:

receive data at the computer video console over a computer network from a friend device of at least a first participant associated with first participant profile information; and automatically and without requiring the first participant to manually log on to the computer video console, configure the computer video console at least in part using information in the first participant profile information, wherein configuring the computer video console at least in part using information in the first participant profile comprises at least one of personalizing electronic store information associated with the first participant, accessing movie Internet streaming account information associated with the first participant, configuring a home screen of the console, presenting information for a particular video game, the information for a particular video game comprising information related to stored data for one or more past games played in the past, the one or more past games being other than a currently presented video game on the computer video console.

2. The assembly of claim 1, wherein the instructions are executable by the at least one processor to:

connect to the computer network; and execute an application to communicate with the computer video console over the computer network to provide the participant profile information to the computer video console.

3. The assembly of claim 2, wherein the instructions are implemented by an application provided by a manufacturer of the computer video console.

4. The assembly of claim 2, wherein the network is a local area network (LAN) and the instructions are executable by the at least one processor to:

responsive to connection to the LAN and without requiring intervening user input, execute the application to communicate with the computer video console over the LAN to provide the participant profile information to the computer video console.

5. The assembly of claim 2, wherein the instructions are executable by the at least one processor to:

responsive to receipt of a signal from a transmitter controlled by the computer video console, execute the application to communicate with the computer video console over the LAN to provide the participant profile information to the computer video console.

6. The assembly of claim 1, wherein the first participant profile information comprises a gaming profile identifier.

7. The assembly of claim 6, wherein the first participant profile information comprises a gaming profile password.

8. The assembly of claim 1, wherein the first participant profile information is usable to access gaming profile data stored remotely from the computer video console.

9. The assembly of claim 1, wherein the computer network is a password-protected Wi-Fi network, and wherein the processor is programmed with instructions to authenticate to the password-protected Wi-Fi network using a password to subsequently communicate with the computer video console over the password-protected Wi-Fi network.

10. The assembly of claim 1, wherein information related to stored data for one or more games played in the past comprises at least one of: a highest level completed for a particular game, status or progress of play for the particular game.

11. A computer video console, comprising;

at least one computer readable storage medium that is not a transitory signal and that comprises instructions executable by at least one processor to:

receive data over a computer network from a first device of at least a first participant associated with first participant profile information; and automatically and without requiring the first participant to manually log on to the computer video console, configure the computer video console at least in part using information in the first participant profile information wherein configuring the computer video console at least in part using information in the first participant profile comprises at least one of personalizing electronic store information associated with the first participant, accessing movie Internet streaming account information associated with the first participant, configuring a home screen of the console, presenting information for a particular video game, the information for a particular game comprising information related to stored data for one or more past games played in the past, the one or more past games being other than a currently presented video game on the computer video console.

12. The computer video console of claim 11, wherein the instructions are executable by the at least one processor to:

log in the first participant using the participant information.

13. The computer video console of claim 12, wherein the first participant is logged in to the computer video console.

14. The computer video console of claim 12, wherein the first participant is logged in to at least one of a gaming network and a server, and wherein the gaming network is different from the computer network.

15. The computer video console of claim 11, wherein the instructions are executable by the at least one processor to:

present data related to the first user on a display accessible to the computer video console.

16. The computer video console of claim 15, wherein the instructions are executable by the at least one processor to:

present a selector on the display that is selectable to add the first participant as a friend of a second user, the second user associated with the computer video console.

17. A method, comprising:

at a computer video console, receiving data over a computer network from a first device of at least a first participant associated with first participant profile information; and automatically and without requiring the first participant to manually log on to the computer video console, configuring the computer video console at least in part using information in the first participant profile information wherein configuring the computer video console at least in part using information in the first participant profile comprises at least one of personalizing electronic store information associated with the first participant, accessing movie Internet streaming account information associated with the first participant, configuring a home screen of the console, presenting information for a particular video game, the information for a particular video game comprising information related to stored data for one or more past games played in the past, the one or more past games being other than a currently presented video game on the computer video console.

18. The first method of claim 17, comprising:

connecting to the computer network; and executing an application to communicate with the computer video console over the computer network to provide the gaming profile information to the computer video console.

19. The method of claim 17, wherein the instructions are implemented by an application associated with a manufacturer of the computer video console.

20. The method of claim 17, comprising:

responsive to receipt of a signal from a transmitter controlled by the computer video console and without requiring intervening user input, executing an application to communicate with the computer video console over the computer network to provide the first participant profile information to the computer video console.

* * * * *